United States Patent Office 3,804,907
Patented Apr. 16, 1974

3,804,907
ORTHO-NITROPHENOL MANUFACTURE
Mahmoud S. Kablaoui, Wappingers Falls, N.Y., assignor to Texaco Inc., New York, N.Y.
No Drawing. Filed Dec. 9, 1970, Ser. No. 96,590
Int. Cl. C07c 79/24
U.S. Cl. 260—622 R  4 Claims

ABSTRACT OF THE DISCLOSURE

Method of preparing o-nitrophenol product comprising contacting nitrobenzene with sodium hydroxide in the presence of a catalytic mixture of potassium t-butyl oxide and o-nitrophenol while simultaneously passing an oxygen containing gas therethrough, acidifying the resultant mixture to a pH less than 7 under aqueous conditions and recovering o-nitrophenol product from the acidified mixture. Ortho-nitrophenol is used in the preparation of o-aminophenol which in turn is useful in the preparation of dyes, pharmaceuticals and photographic chemicals.

BACKGROUND OF THE INVENTION

This invention relates to the preparation of ortho-nitrophenol from mononitrobenzene.

In the past o-nitrophenol was usually prepared from hydrolysis of o-nitrochlorobenzene or from nitration of phenol to ortho and para nitrophenols followed by separation of the o-nitrophenol by steam distillation. Although these prior methods produced o-nitrophenol, they were found lacking in yield and/or selectivity.

DESCRIPTION OF THE INVENTION

I have discovered and this constitutes my invention a catalytic method of converting nitrobezene into o-nitrophenol in improved yields and selectivities employing sodium hydroxide which is several-fold less expensive than potassium hydroxide. Specifically, the method comprises as a first phase contacting nitrobenzene with sodium hydroxide in the presence of a catalytic amount of potassium t-butyl oxide and o-nitrophenol while simultaneously passing an oxygen containing gas through the reaction mixture at a temperature between about 50 and 150° C. to form sodium o-nitrophenoxide intermediate. In respect to ingredient quantities in the first phase, the nitrobenzene to sodium hydroxide mole ratio employed is between about 1:0.5 and 1:10, preferably between about 1:1 and 1:2. The potassium t-butyl oxide catalyst is present in an amount of between about 0.5 and 10 wt. percent, preferably between about 2 and 4 wt. percent, and the o-nitrophenol is present in an amount of between about .01 and 1.0 wt. percent, preferably between 0.1 and 0.5 wt. percent, based on the first phase reaction mixture. The total amount of oxygen containing gas introduced into the reaction mixture is advantageously about 1:1 mole of oxygen per mole of initial nitrobenzene and up to 10:1 and higher. The reaction period of the first phase is normally between about 1 and 5 hours, however, on a commercial scale economics will dictate the exact length of time, that is, time versus yield.

In the second phase of the method the first phase reaction mixture containing sodium o-nitrophenoxide intermediate is diluted with water advantageously in an amount of between about 1 and 100 volumes water per volume of first phase reaction mixture, preferably followed by removing unreacted nitrobenzene and azoxybenzene by-product, e.g., via extraction with a suitable solvent such as ether. In any case, the water layer is acidified to a pH of less than 7, desirably at a temperature of between about 10 and 40° C. The formed o-nitrobenzene in the second phase is recovered by standard means such as cooling the acidified mixture, e.g., to between about 0 and 10° C. and recovering the precipitated o-nitrophenol, e.g., via filtration and desirably washing the filtered solid, e.g., with petroleum ether to further purify the product.

Under advantageous conditions, the first and second stages of the reaction are subjected to agitation such as stirring to facilitate contact of the ingredients. To further facilitate reactant contact the sodium hydroxide employed is desirably in a finely divided state such as in powdered form.

Hereinbefore and hereinafter by the term "an oxygen containing gas" it is intended to denote air, oxygen and synthetic mixtures of oxygen and inert gas such as mixtures of oxygen and nitrogen. Preferably, the oxygen gas is carbon dioxide free to insure minimal by-product formation.

Examples of the acidification acids contemplated herein are the mineral acids such as hydrochloric, sulfuric, nitric and phosphoric.

Inert liquid diluent may be employed in the first phase to facilitate reactant contact. Examples of suitable reaction diluents are xylenes and high boiling liquid paraffins. Diluent when utilized is normally present in an amount of between about 1 and 5 wt. percent of the reaction mixture.

In respect to the material features of the invention, if the use of the catalyst mixture as defined is omitted, the procedure is rendered inoperative. This is also true if sodium hydroxide is omitted. Further, when an oxygen containing gas is deleted from the process, the selectivity and yield of o-nitrophenol is substantially reduced due to material formation of azoxybenzene by-product. Still further, the employment of a weight excess of nitrobenzene reactant in comparison to the sodium hydroxide results in a substantial improvement in yield.

The following examples further illustrate the method the invention and the material features thereof.

EXAMPLE I

To a 300 mls. 3-necked flask equipped with a thermometer, condenser and gas inlet tube, nitrobenzene distilled under vacuum (100° C.—mm. Hg) was charged. Additionally charged was dry powdered sodium hydroxide and to the resultant mixture dry air (free of $CO_2$) was blown through the reaction mixture at a rate of 235 mls. per minute. At the end of the reaction period the air blowing was ceased and the reaction mixture was cooled to room temperature and water was added in an amount of 50 volumes per volume reaction mixture. The resultant aqueous mixture was extracted three times with 50 mls. of ether. Subsequent to extraction the residual water layer was acidified to a pH of about 3 with concentrated hydrochloric acid, cooled to 5° C. with a solid precipitating from the cooled mixture. The solid was isolated by filtration and identified via infrared spectral analysis and melting point as o-nitrophenol.

Utilizing the foregoing overall procedure, seven runs were made. Run 1 represents the method of the invention and comparative Runs 2, 3, 4, 5, 6 and 7 demonstrates the importance of ingredients as defined. The test data are reported below in Table I and the results in Table 1A:

TABLE I

| Run No. | Mmole φ-NO² | Mmole NaOH | Catalyst | Grams | Hours | °C. |
|---|---|---|---|---|---|---|
| 1 | 325.2 | 500.0 | t-BuOK / o-Nitrophenol | 1.0 / 0.2 | 1 | 100 |
| 2 | 65.0 | 625.0 | | | 3 | 130 |
| 3 | 325.2 | 500.0 | t-BuOK | 1.0 | 2 | 90 |
| 4 | 325.2 | 500.0 | o-Nitrophenol | 0.2 | 1 | 100 |
| 5 | 325.2 | 500.0 | Potassium salt of o-nitrophenol. | 0.3 | 1 | 100 |
| 6 | 325.2 | 500.0 | KOH / o-Nitrophenol | 1.0 / 0.2 | 1 | 100 |
| 7 | 325.2 | 500.0 | t-BuOK / p-Nitrophenol | 1.0 / 0.2 | 1 | 100 |

TABLE IA
Yield of o-nitrophenol

| Run No. | Catalyst | o-Nitrophenol product Percent selectivity | Percent conversion |
|---|---|---|---|
| 1 | t-BuOK / o-Nitrophenol | 98 | 6.5 |
| 2 | | 0 | 0 |
| 3 | t-BuOK | 0 | 0 |
| 4 | o-Nitrophenol | 0 | 0 |
| 5 | Potassium salt of o-nitrophenol | 0 | 0 |
| 6 | KOH / o-Nitrophenol | 0 | 0 |
| 7 | p-Nitrophenol / t-BuOK | 0 | 0 |

I claim:

1. A method of preparing o-nitrophenol comprising contacting nitrobenzene with sodium hydroxide at a temperature between about 50 and 150° C. in the presence of between about 0.5 and 10 wt. percent potassium t-butoxide and between about .01 and 1.0 wt. percent o-nitrophenol while simultaneously introducing an oxygen containing gas into the reaction mixture, subsequently acidifying the resultant reaction mixture under aqueous conditions to a pH of less than 7 and recovering said o-nitrophenol from the acidified mixture, said nitrobenzene and said sodium hydroxide being present in a mole ratio of between about 1:0.5 and 1:10.

2. A method in accordance with claim 1 wherein said sodium hydroxide is powdered.

3. A method in accordance with claim 1 wherein the total oxygen introduced into said reaction mixture is between about 1:1 and 10:1 moles $O_2$:mole nitrobenzene.

4. A method in accordance with claim 3 wherein said oxygen containing gas is carbon dioxide free air, and said acidifying comprises diluting said reaction mixture with between about 1 and 100 volumes water/volume reaction mixture and introducing a mineral acid into the resultant diluted mixture at a temperature between about 10 and 40° C. until a pH less than 7 is attained.

References Cited

UNITED STATES PATENTS

| 3,461,173 | 8/1969 | Peterson | 260—622 R |
| 3,468,963 | 9/1969 | Liecht et al. | 260—620 |
| 3,360,572 | 12/1967 | Selwitz | 260—621 |
| 3,033,903 | 5/1962 | Loeb | 260—621 |

FOREIGN PATENTS

| 1,581,400 | 9/1969 | France | 260—622 R |

OTHER REFERENCES

Colbert et al.: "J. Amer. Chem. Soc." vol. 59, pp. 1122–24.

Wolh: "Berichte," vol. 32, pp. 3486–88 (1899).

JOSEPH E. EVANS, Primary Examiner

W. B. LONE, Assistant Examiner

U.S. Cl. X.R.

260—205, 621 G